US008776533B2

(12) United States Patent
Feindel et al.

(10) Patent No.: US 8,776,533 B2

(45) Date of Patent: Jul. 15, 2014

(54) STRAIN TOLERANT BOUND STRUCTURE FOR A GAS TURBINE ENGINE

(75) Inventors: David T. Feindel, Ellington, CT (US); Paul W. Palmer, S. Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1164 days.

(21) Appl. No.: 12/719,051

(22) Filed: Mar. 8, 2010

(65) Prior Publication Data

US 2011/0214433 A1 Sep. 8, 2011

(51) Int. Cl.
*F02C 7/20* (2006.01)

(52) U.S. Cl.
USPC .......... 60/796

(58) Field of Classification Search
USPC .......... 60/796–799; 415/182.1, 185, 191, 415/209.3, 209.4; 416/204 R, 210 R, 210 A, 416/232
See application file for complete search history.

(56) References Cited

U.S. PATENT DOCUMENTS

| | | | | |
|---|---|---|---|---|
| 2,724,544 | A * | 11/1955 | Hardigg | 415/209.4 |
| 2,809,491 | A * | 10/1957 | Wosika | 239/265.37 |
| 3,166,903 | A * | 1/1965 | White | 60/797 |
| 3,708,242 | A * | 1/1973 | Bruneau et al. | 415/209.4 |
| 4,023,350 | A | 5/1977 | Hovan et al. | |
| 4,183,207 | A * | 1/1980 | Libertini | 60/39.08 |
| 4,478,551 | A | 10/1984 | Honeycutt, Jr. et al. | |
| 4,492,078 | A * | 1/1985 | Williamson | 60/797 |
| 4,993,918 | A | 2/1991 | Myers et al. | |
| 5,249,418 | A * | 10/1993 | Finn | 60/797 |
| 5,259,183 | A * | 11/1993 | Debeneix | 60/797 |
| 5,823,739 | A * | 10/1998 | Van Duyn | 415/9 |
| 6,553,665 | B2 * | 4/2003 | Gunn et al. | 29/889.21 |
| 7,100,358 | B2 | 9/2006 | Gekht et al. | |
| 7,553,130 | B1 * | 6/2009 | Mons et al. | 415/200 |
| 8,388,306 | B2 * | 3/2013 | Somanath et al. | 415/126 |
| 2008/0063520 | A1 * | 3/2008 | Baumann et al. | 415/209.3 |
| 2008/0220207 | A1 | 9/2008 | Ravey | |

* cited by examiner

*Primary Examiner* — Phutthiwat Wongwian
(74) *Attorney, Agent, or Firm* — Kinney & Lange, P.A.

(57) ABSTRACT

A gas turbine engine includes bound assemblies with an inner diameter ring, struts, and an outer diameter ring. The strut is connected to the inner diameter ring and extends radially outward therefrom to connect to the outer diameter ring. A strain relief feature is disposed adjacent to or at the connection between the strut and the inner diameter ring and/or the outer diameter ring. The strain relief feature lengthens the arc segment of fillet curvature. For a constant thermal punch load, the lengthened arc segment of fillet curvature results in a decreased maximum strain in the bound assembly.

25 Claims, 6 Drawing Sheets

STRAIN TOLERANT BOUND STRUCTURE FOR A GAS TURBINE ENGINE

BACKGROUND

The present application relates to gas turbine engines, and more particularly, to bound assemblies disposed along the gas flow path of gas turbine engines.

Within the core of the gas turbine engine, working gases flow along a gas flow path, which in various sections of the engine can be defined by an inner case and an outer case. The inner case is disposed radially inward of the outer case with respect to the centerline of the gas turbine engine. Both cases are commonly comprised of a plurality of ring shaped structures that are assembled and connected axially to one another to form the housing/casing that defines the gas flow path. A plurality of airfoils comprising static vanes and rotor blades are disposed within the gas flow path along the compressor and turbine stages to extract mechanical work from the working gases. With high bypass turbofan engines, bound assemblies such as static ring/strut/ring assemblies are disposed in the gas flow path at various stages including in or adjacent the fan section, compressor section, turbine section, exhaust section, and diffuser. Ring/strut/ring assemblies can be thought of as bound assemblies because the strut is connected to both the inner case and the outer case. Bound assemblies are commonly used to provide structural support to one or both of the cases or to bearings which support the shafts that rotate within the engine. Bound assemblies such as struts are also used in some applications for aerodynamic and/or noise reduction purposes within the gas flow path.

Gas turbine engines are continually undergoing changes with the goals of improving performance, decreasing size and weight for a given thrust rating, while reducing cost and enhancing durability and repairability. To improve performance, it is typical to increase the operation temperature of the engine, since increased temperatures generally will translate into improved engine performance. As a result of the increased temperatures, the components disposed in and adjacent to the gas flow path are subjected to increased temperature gradients.

Increased temperature gradients, and temperature gradients in general, pose a particular problem for bound assemblies because the gradients typically result in the struts being heated to a greater degree than the inner case and outer case. This differential heating creates a thermal growth differential between the struts and inner case and the outer case, which results in the struts expanding to a greater degree than the cases. In particular, the thermal growth differential makes the strut attempt to expand radially outward with the expansion of the inner case. The amount of this expansion differs from the amount of expansion of the outer case, which expands to a lesser degree. However, barring a catastrophic failure, the strut remains connected to both the inner case and outer case during thermal induced expansion, with the result being a thermal fight or "punch load" that typically causes high strains in or near the curved fillets that connect the cases with the struts. These high strains limit the number of thermal cycles the bound structure can be exposed to before experiencing cracks in or near the fillets. The cracks limit the useful service life of the bound structure.

SUMMARY

A bound assembly for a gas turbine engine includes an inner diameter ring, a strut, and an outer diameter ring. The inner diameter ring is disposed radially around a centerline of the gas turbine engine. The strut is connected to the inner diameter ring and extends radially outward therefrom to connect to the outer diameter ring. The inner diameter ring, strut and/or the outer diameter ring has a strain relief feature that is disposed adjacent to or at the connection between the strut and the inner diameter ring and/or the outer diameter ring. The strain relief feature lengthens the arc segment of fillet curvature. For a constant thermal punch load this results in a decreased maximum strain in the bound assembly.

DETAILED DESCRIPTION

The present application describes a crenellated strain relief feature(s) for reducing maximum strain in bound assemblies that are subject to thermal gradients within gas turbine engines. In particular, the strain relief feature(s) reduces maximum strain in ring/strut/ring assemblies disposed adjacent to or along the gas flow path of a gas turbine engine. By reducing maximum strain, the strain relief feature improves the service life of the bound assemblies within gas turbine engines.

Figure 1:
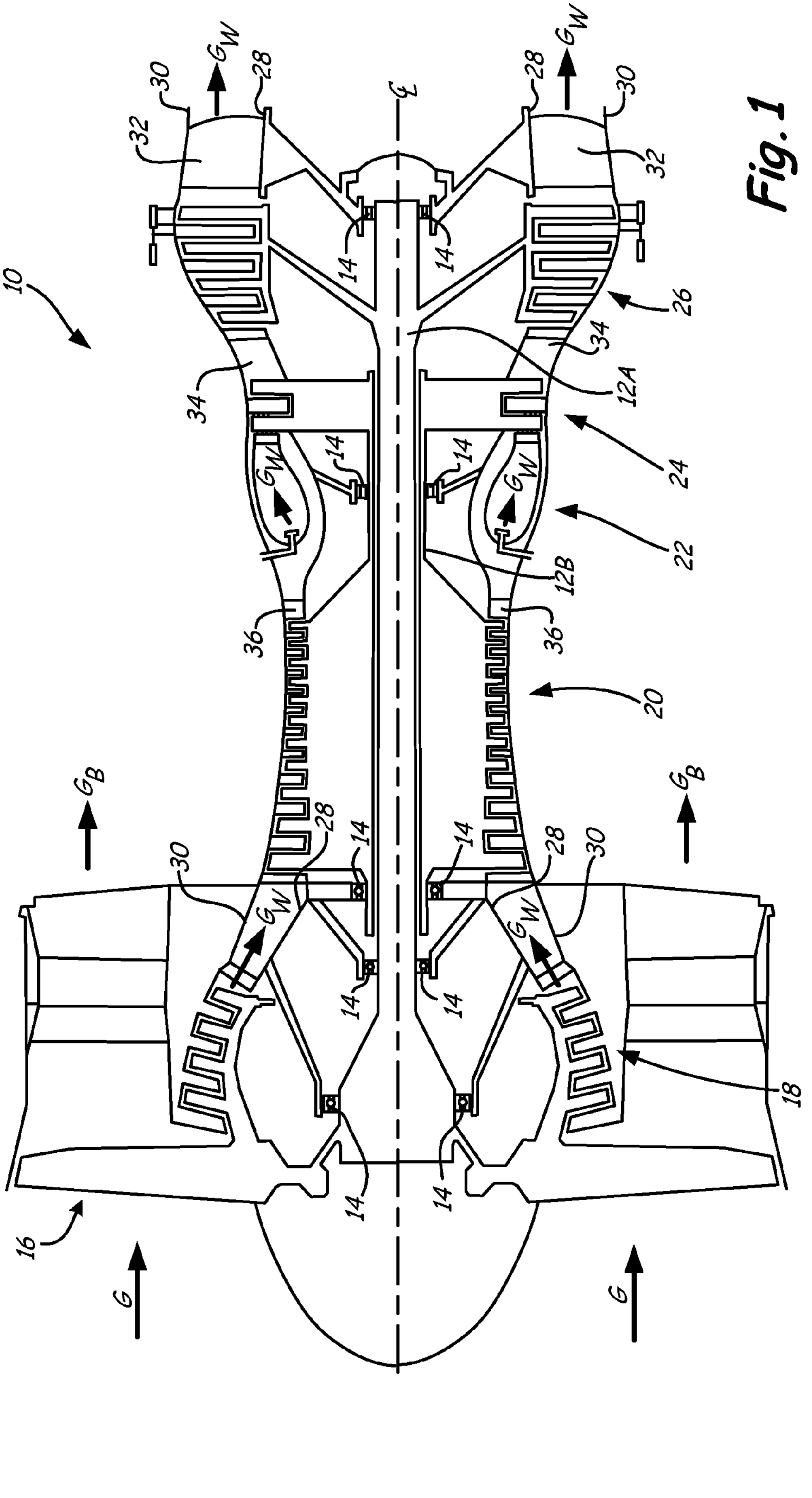
FIG. 1 is a schematic cross-sectional view of one embodiment of a gas turbine engine in which various bound assemblies are used.

FIG. 1 shows a schematic cross section of a gas turbine engine 10. Gas turbine engine 10 has anti-friction bearings 14 that support shafts 12A and 12B. Gas turbine engine 10 is defined around an engine centerline $C_L$ about which various engine sections rotate. In FIG. 1, gas turbine engine 10 includes a fan section 16, a low pressure compressor (LPC) section 18, a high pressure compressor (HPC) section 20, a combustor 22, a high pressure turbine section 24, and a low pressure turbine section 26. Working gases $G_w$ are defined by an inner case 28 and an outer case 30 to travel through the various sections 18, 20, 24 and 26 of gas turbine engine 10. Bearings 14, inner case 28, and/or outer case 30 are supported at various locations along gas turbine engine 10 by bound assemblies including turbine exhaust struts 32, a mid-turbine frame 34, and a diffuser case 36.

Gas turbine engine 10 is illustrated as a high bypass ratio turbofan engine with a dual spool arrangement in which fan section 16 and LPC section 18 are connected to a low pressure turbine section 26 by various rotors and shaft 12A, and HPC section 20 is connected to high pressure turbine section 24 by second shaft 12B. The general construction and operation of gas turbine engines, and in particular turbofan engines, is well-known in the art, and therefore, detailed discussion herein is unnecessary. It should be noted, however, that engine 10 is shown in FIG. 1 merely by way of example and not limitation. The present invention is also applicable to a variety of other gas turbine engine configurations, such as a turboprop engine, for example.

Gas is pulled into fan section 16 by the rotation of the fan blades about the centerline axis $C_L$. The gas is divided into streams of working gas $G_w$ (primary air) and bypass gas $G_B$ after passing the fan. The fan is rotated by low pressure turbine section 24 through shaft 12A to accelerate the bypass gas $G_B$ through fan section 16, thereby producing a significant portion of the thrust output of engine 10.

The working gas $G_w$ is directed along a gas flow path that extends through engine 10. In particular, the working gas $G_w$ flows through LPC section 18 to HPC section 20 then to high pressure turbine section 24 and low pressure turbine section 26. The working gas $G_w$ is mixed with fuel and ignited in combustor 22 and is then directed into the turbine sections 24 and 26 where the mixture is successively expanded through alternating stages of airfoils comprising rotor blades and stator vanes to extract mechanical work therefrom.

In the various sections 18, 20, 24 and 26, and between the various sections of gas turbine engine 10, the gas flow path can be bounded by inner case 28 and outer case 30. Examples of bound assemblies include turbine exhaust struts 32, mid-turbine frame 34, and diffuser case 36. These bound assemblies provide structural support for bearings 14, inner case 28 and/or outer case 30 in various locations within turbine engine 10. Bound assemblies such as guide vanes can also serve non-structural purposes such as for aerodynamic improvement and/or noise reduction.

In particular, turbine exhaust struts 32 are positioned rearward of low pressure turbine section 26 in gas flow path. The extremely hot working gas $G_w$ exhausted from low pressure turbine section 26 passes across turbine exhaust struts 32. Inner case 28, outer case 30, and turbine exhaust struts 32 are connected together as an assembly, commonly called a turbine exhaust case. Turbine exhaust struts 32 are used to support a rear bearing 14 and impart an axial direction to working air $G_w$, thereby increasing the velocity of working gas $G_w$ to increase its momentum and generate more thrust. Similarly, mid-turbine frame 34 is located between high pressure turbine section 24 and low pressure turbine section 26 and transfers load from bearings 14 and bearing support structures to inner case 28 and/or outer case 30. Diffuser case 36 includes struts connecting the diffuser (located between HPC 20 and combustor 22) to outer case 30. Diffuser case 36 can be used to support at least one bearing 14.

Figure 2:
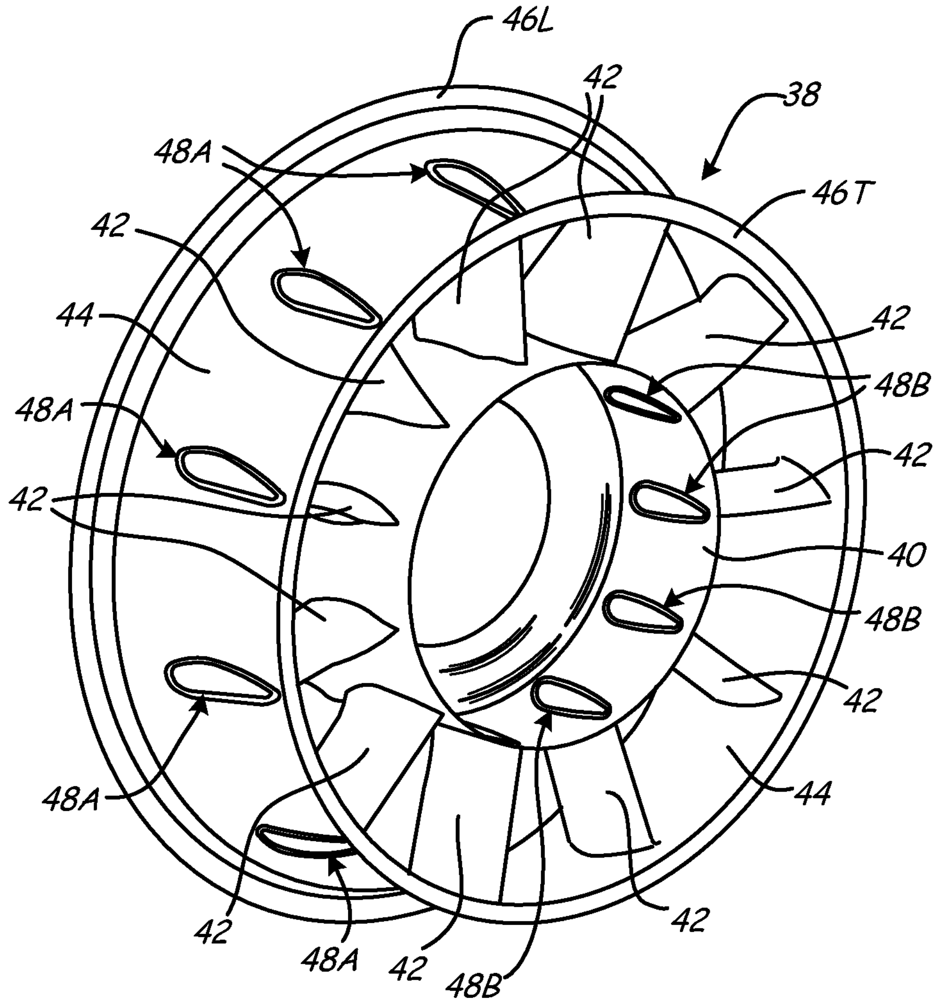
FIG. 2 is a perspective view of a bound assembly with several strain relief features disposed around an inner and outer portion thereof.

FIG. 2 shows a perspective view of a bound assembly 38. Bound assembly 38 includes an inner diameter ring 40, struts 42 and an outer diameter ring 44. Outer diameter ring 44 includes leading edge flange 46L and trailing edge flange 46T. Bound assembly 38 also includes a plurality of strain relief features 48A and 48B.

As previously discussed, bound assembly 38 can comprise one of many turbine engine structures. Inner diameter ring 40 is disposed radially around the centerline $C_L$ of the gas turbine engine 10 (FIG. 1). Inner diameter ring 40 can comprise a portion of or be disposed adjacent inner case 28 (FIG. 1). Struts 42 connect to inner diameter ring 40 in a manner known in the art (e.g., welding, forging, casting and subsequent fabrication). It should be noted that strain relief features 48A are distinct from and should be disposed at a distance from welding joints. Struts 42 can be hollow or solid structures and extend radially outward from inner diameter ring 40 to connect to outer diameter ring 44 in a plurality of locations. Thus, outer diameter ring 44 is disposed radially outward of inner diameter ring 40. Strain relief features 48A are disposed along outer diameter ring 44 at connection between struts 42 and outer diameter ring 44. Outer diameter ring 44 extends axially forward and aft of struts with respect to the centerline $C_L$ and extends to leading edge flange 46L and trailing edge flange 46T. Leading edge flange 46L and trailing edge flange 46T are adapted to connect bound assembly 38 to adjacent structures or other bound assemblies 38 utilizing fasteners (not shown) or other means. Leading edge flange 46L is disposed downstream of trailing edge flange 46T (as defined by the direction of flow of the working gas $G_w$). Bound assemblies 38 can be connected together to form inner case 28 (FIG. 1) and outer case 30 (FIG. 1) such that the working gas $G_w$ flows past struts 42.

Figure 2A:
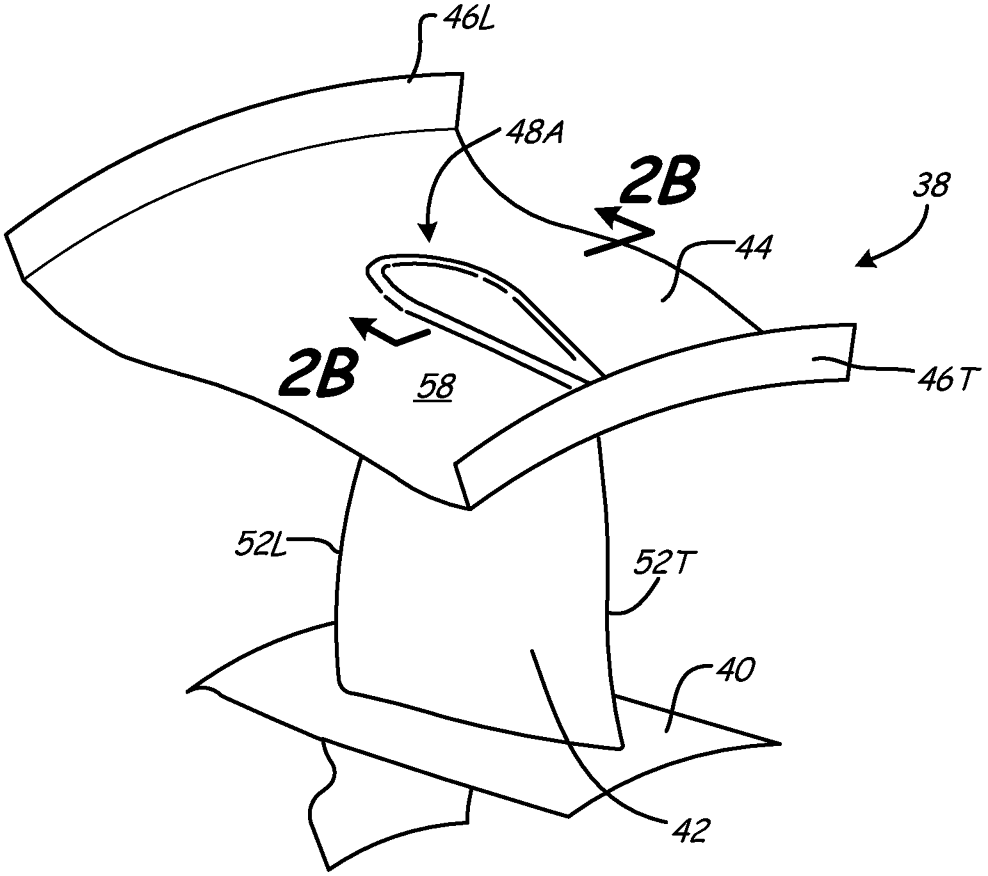
FIG. 2A is a partial sectional view of the bound assembly of FIG. 2 showing portions of an outer and inner diameter ring and a strut.

FIG. 2A shows a partial section of bound assembly 38 from FIG. 2. Bound assembly 38 includes strain relief feature 48A disposed adjacent to or at the connection between the strut 42 and inner diameter ring 40 and/or the outer diameter ring 44. As illustrated in FIG. 2A, strain relief feature 48A is a crenellation or ridge on outer diameter ring 44 that extends radially outward from an outer radial surface 58 of the outer diameter ring 44. Strain relief feature 48A extends around the entire connection between the strut 42 and outer diameter ring 44. Thus, strain relief feature 48A extends around the leading edge 52L of strut 42 and the trailing edge 52T of strut 42. In other embodiments, strain relief feature 48A may be localized to adjacent leading edge 52L and/or trailing edge 52T only, or disposed adjacent other portions of connection. Thus, strain relief feature 48A would not extend entirely around the connection between the strut 42 and the inner diameter ring 40 and/or the outer diameter ring 44.

Figure 2B:
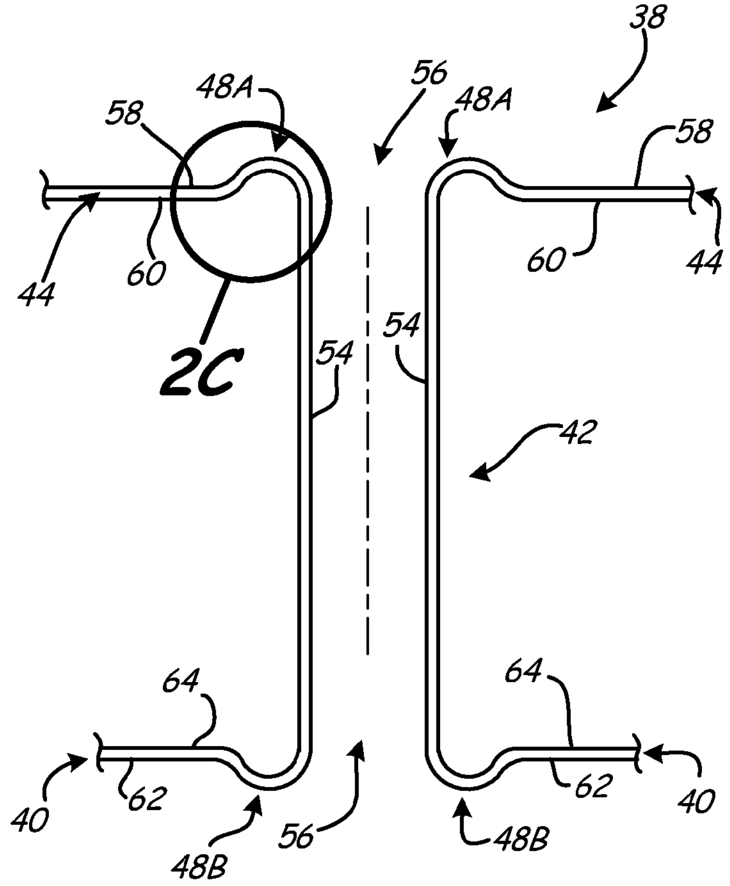
FIG. 2B is a sectional view of the bound assembly of FIG. 2A taken along line B-B that extends through the outer diameter ring, inner diameter ring and strut.

FIG. 2B shows a sectional view of bound assembly 38 that extends through the outer diameter ring 44, inner diameter ring 40, and strut 42 along line B-B of FIG. 2A. The sectional view extends through strain relief feature 48A which is disposed adjacent a body 54 of strut 42 near or at a mouth 56 thereof. In particular, strain relief feature 48A is disposed at the connection between strut 42 and outer diameter ring 44 and strain relief feature 48B is disposed at the connection between strut 42 and inner diameter ring 40. As illustrated in FIG. 2B, strain relief feature 48A is curved in shape such that it comprises a ridge on outer diameter ring 44 that extends radially outward so as to create an offset from outer radial surface 58 thereof. The curvature of strain relief feature 48A also creates a depression or trench that extends along an inner radial surface 60 of the outer diameter ring 44. Second strain relief feature 48B is located on inner diameter ring 40 adjacent strut 42 and is curved in shape so as to comprise a ridge on inner diameter ring 40. Strain relief feature 48B extends radially inward toward the centerline $C_L$ of engine 10 (FIG. 1) so as to create an offset between an inner radial surface 62 and the second strain relief feature 48B. The curvature of second strain relief feature 48B creates a depression or trench that extends along an outer radial surface 64 of inner diameter ring 40. Although illustrated with similar cross-sectional shapes, strain relief feature 48A and second strain relief feature 48B need not be of the same size or shape or extend around strut 42 to the same extent. In some embodiments, strain relief feature 48A and/or 48B can be sized so as to extend beyond the boundary layer (a region characterized by low velocity flows which vary in direction with respect to the mainstream velocity according to local pressure gradients) into the mainstream of gas flow path. In other embodiments, strain relief feature 48A and/or 48B can be sized so as not to extend beyond the boundary layer.

Figure 2C:
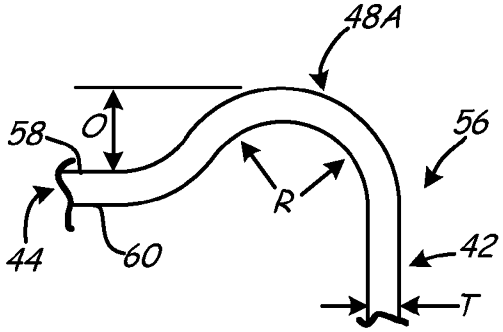
FIG. 2C is an enlarged sectional view of a strain relief feature disposed at and adjacent to the connection between the strut and the outer diameter ring.

As shown in FIG. 2C, strain relief feature 48A has arcuate inner and outer radii (only inner radii R are illustrated) and extends outward to create offset O a distance from outer radial surface 58. The distance of the offset O can vary. As illustrated in FIG. 2C, radii R lengthen the arc segment of fillet curvature and give strain relief feature 48A a continuous transition from one radius R to the next. In one embodiment, the height of strain relief feature 48A (or depth of depression) relative to outer radial surface 58 of outer diameter ring 44 is dependant upon a cross sectional thickness T of outer diameter ring 44. For example, the offset O distance can be one or two times that of thickness T of outer diameter ring 44 to reduce peak strain due to temperature gradients. In other embodiments, the height or the depth of the strain relief feature(s) relative to a surface of inner diameter ring 40 or outer diameter ring 44 is dependant upon a cross sectional thickness of the inner diameter ring 40 or strut 42.

Figure 3:
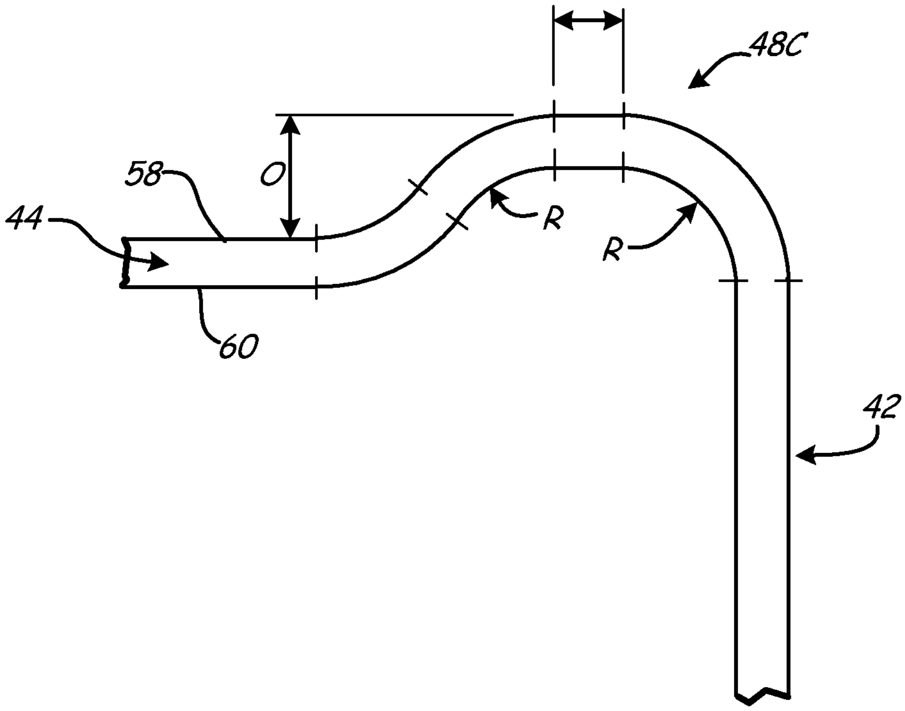
FIG. 3 is an enlarged sectional view of another embodiment of the strain relief feature at and adjacent to the connection between the strut and the outer diameter ring.

FIG. 3 illustrates another embodiment of strain relief feature 48C. Instead of having a continuous transition between radii R as illustrated in FIG. 2C, strain relief feature 48C can have an area with no radius (a flat area) between radii R. The geometry (cross sectional area, length, location relative to or within strut 42) of the strain relief features can be varied to reduce maximum strain of bound assembly 38 during operation. In particular, the geometry of the strain relief features can be optimized to design criteria to reduce maximum strain using commercially available finite element analysis tools such as software retailed by ANSYS, Inc. of Canonsburg, Pa. The strain relief feature lengthens the arc segment of fillet curvature. For a constant thermal punch load the lengthened arc segment of fillet curvature results in a decreased maximum strain in the bound assembly. The strain relief feature reduces maximum strain by spreading the total thermally induced strain over a larger area than conventional fillets. Lower values of maximum strain allows for an increased number of thermal cycles before initiation of cracks and a longer service life for the bound assembly.

Figure 4:
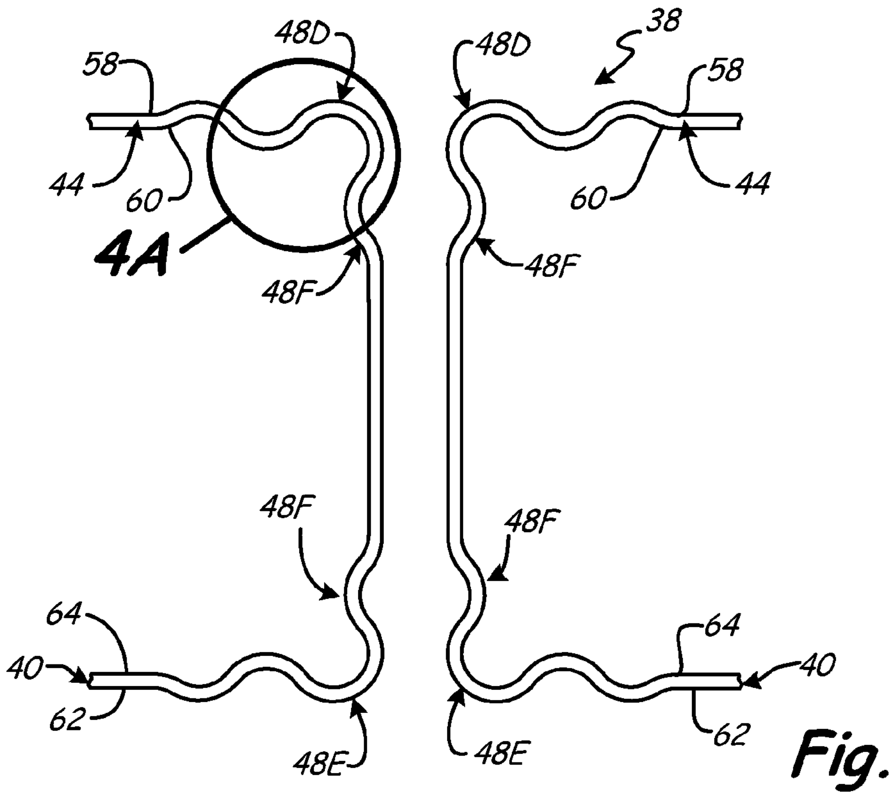
FIG. 4 is a sectional view of the bound assembly taken along a line extending through the outer diameter ring, inner diameter ring and strut and showing another embodiment of the strain relief features.
Figure 4A:
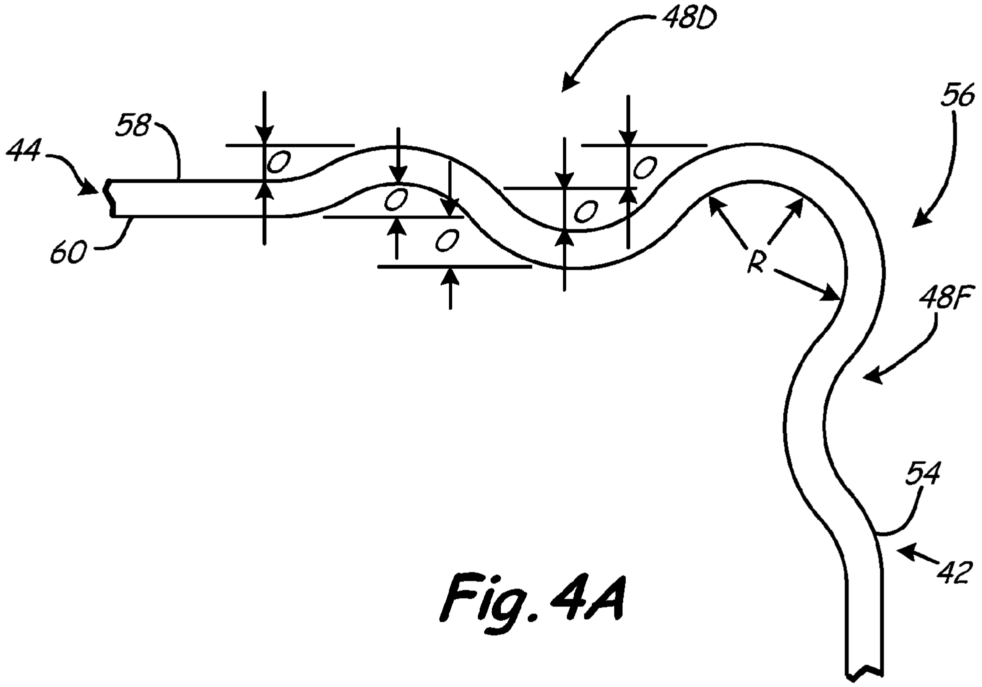
FIG. 4A is an enlarged sectional view of the strain relief features from FIG. 4.

FIGS. 4 and 4A show cross sections of bound assembly 38 with a strain relief feature 48D and a strain relief feature 48E disposed adjacent strut 42 and a strain relief feature 48F disposed in strut 42. Strain relief feature 48D is disposed at the connection between strut 42 and outer diameter ring 44 and has a sinusoidal cross section that creates ridges and a depression on outer radial surface 58 and depressions and a ridge on inner radial surface 60 of outer diameter ring 44. Similarly, strain relief feature 48E is disposed at the connection between strut 42 and inner diameter ring 40 and has a sinusoidal cross section that creates ridges and a depression on inner radial surface 62 and depressions and a ridge on outer radial surface 64 of inner diameter ring 40. Strain relief feature 48F is positioned within the body 54 of strut 42 adjacent mouth 56 and strain relief feature 48D. Together, strain relief features 48D, 48E, and 48F reduce maximum strain in bound assembly 38. As discussed previously, the geometry of the strain relief features can be optimized to design criteria to reduce maximum strain using ANSYS.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A bound assembly for a gas turbine engine, comprising:

an inner diameter ring disposed radially around a centerline of the gas turbine engine;

a strut connected to the inner diameter ring and extending radially outward therefrom; and an outer diameter ring connected to the strut and disposed radially outward of the inner diameter ring, wherein the inner diameter ring, or the outer diameter ring has a strain relief feature that is disposed at the connection between the strut and either the inner diameter ring or the outer diameter ring, wherein the strain relief feature comprises a curvature in shape and extends around substantially the entire connection between the strut and either the inner diameter ring or the outer diameter ring.

2. The assembly of claim 1, wherein the strain relief feature has a plurality of radii.

3. The assembly of claim 1, wherein the strain relief feature comprises at least one of a ridge that extends radially outward from an outer radial surface of the outer diameter ring and a depression that extends into the outer radial surface of the outer diameter ring.

4. The assembly of claim 1, wherein the strain relief feature comprises at least one of a ridge that extends radially inward toward the centerline from an inner radial surface of the outer diameter ring and a depression that extends into the inner radial surface of the outer diameter ring.

5. The assembly of claim 1, wherein the strain relief feature comprises at least one of a ridge that extends radially outward from an outer radial surface of the inner diameter ring and a depression that extends into the outer radial surface of the inner diameter ring.

6. The assembly of claim 1, wherein the strain relief feature comprises at least one of a ridge that extends radially inward toward the centerline from an inner radial surface of the inner diameter ring and a depression that extends into the inner radial surface of the inner diameter ring.

7. The assembly of claim 1, wherein a height or a depth of the strain relief feature relative to a surface of the inner diameter ring or the outer diameter ring is dependent upon a cross sectional thickness of at least one of the strut, inner diameter ring, and outer diameter ring.

8. The assembly of claim 1, wherein the strain relief feature extends around the entire connection between the strut and at least one of the inner diameter ring and the outer diameter ring.

9. The assembly of claim 1, wherein at least one of a height, width, and depth of the strain relief feature varies as the strain relief feature extends along at least one of the inner diameter ring and outer diameter ring.

10. The assembly of claim 1, wherein the bound assembly comprises a portion of a turbine exhaust case, diffuser case, or a mid-turbine frame.

11. A gas turbine engine, comprising:

a compressor section, a combustor, a turbine section, and an exhaust section; and a bound assembly disposed within or adjacent to the compressor section, the combustor, the turbine section or the exhaust section, the bound assembly includes:

an inner case disposed radially around a centerline of the gas turbine engine;

a plurality of struts connected to the inner case and extending radially outward therefrom through a gas flow path that extends through the gas turbine engine; and an outer case connected to the struts and disposed radially outward of the inner case, wherein the inner case, the outer case has a strain relief feature disposed at the connection between the struts and either the inner case or the outer case, wherein the strain relief feature extends around substantially the entire connection between the strut and either the inner diameter ring or the outer diameter ring.

12. The gas turbine engine of claim 11, wherein the strain relief feature is a ridge that extends radially with respect to at least one of an inner radial surface and outer radial surface of the outer case or inner case.

13. The gas turbine engine of claim 11, wherein the strain relief feature is a depression that extends into at least one of an inner radial surface and outer radial surface of the outer case or inner case.

14. The gas turbine engine of claim 11, wherein the strain relief feature is disposed within at least one of the struts.

15. The gas turbine engine of claim 11, wherein a height or a depth of the strain relief feature relative to a surface of the inner case or the outer case is dependent upon a cross sectional thickness of at least one of the inner case, and outer case.

16. A turbine exhaust case of a gas turbine engine, comprising:

an inner case disposed radially around a centerline of the gas turbine engine;

a plurality of struts connected to the inner case and extending radially outward therefrom through a gas flow path; and an outer case connected to the struts and disposed radially outward of the inner case, wherein the inner case, or the outer case has a strain relief feature disposed adjacent to or at the connection between the struts and either the inner case or the outer case, wherein the strain relief feature comprises a curvature in shape and extends around substantially the entire connection between the strut and either the inner diameter ring or the outer diameter ring.

17. The turbine exhaust case of claim 16, wherein the strain relief feature is a ridge that extends radially from at least one of an inner radial surface and outer radial surface of the outer case or inner case.

18. The turbine exhaust case of claim 16, wherein the strain relief feature is a depression that extends into at least one of an inner radial surface and outer radial surface of the outer case or inner case.

19. A bound assembly for a gas turbine engine, comprising:

an inner diameter ring disposed radially around a centerline of the gas turbine engine;

a strut connected to the inner diameter ring and extending radially outward therefrom; and an outer diameter ring connected to the strut and disposed radially outward of the inner diameter ring, wherein the strut has a strain relief feature that is disposed adjacent to the connection between the strut and either the inner diameter ring or the outer diameter ring, wherein the strain relief feature comprises a curvature in shape, and extends entirely around the strut.

20. The assembly of claim 19, wherein the strain relief feature is disposed within the strut.

21. The assembly of claim 19, wherein the strain relief feature has a plurality of radii.

22. The assembly of claim 19, wherein the strain relief feature is disposed adjacent at least one of a leading and a trailing edge of the strut.

23. The assembly of claim 19, wherein the bound assembly comprises a portion of a turbine exhaust case, diffuser case, or a mid-turbine frame.

24. A gas turbine engine, comprising:

a compressor section, a combustor, a turbine section, and an exhaust section;

and a bound assembly disposed within or adjacent to the compressor section, the combustor, the turbine section or the exhaust section, the bound assembly includes:

an inner case disposed radially around a centerline of the gas turbine engine;

a plurality of struts connected to the inner case and extending radially outward therefrom through a gas flow path that extends through the gas turbine engine; and an outer case connected to the struts and disposed radially outward of the inner case, wherein struts have strain relief features disposed adjacent to the connection between the struts and either the inner case or the outer case, wherein the strain relief feature comprises a curvature in shape and extends entirely around each of the struts.

25. The assembly of claim 24, wherein the strain relief feature is disposed within each of the struts.

* * * * *